Oct. 22, 1968   J. PRATA   3,407,284
ELECTRIC AIR HEATER

Filed Nov. 4, 1965   2 Sheets-Sheet 1

John Prata
INVENTOR.

BY Clarence A. O'Brien
and Harvey B. Jacobson
Attorneys

Oct. 22, 1968    J. PRATA    3,407,284
ELECTRIC AIR HEATER
Filed Nov. 4, 1965    2 Sheets-Sheet 2
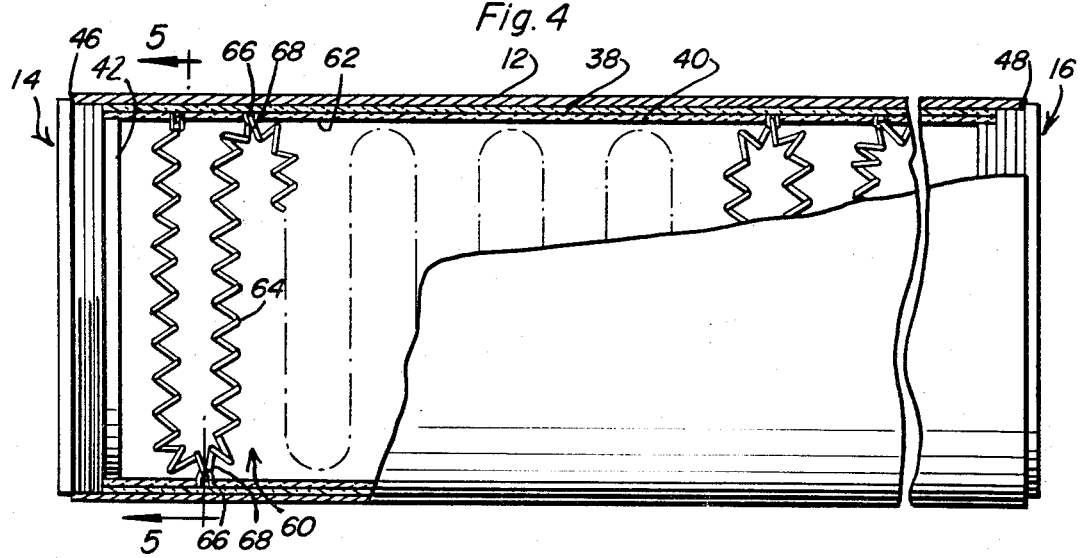
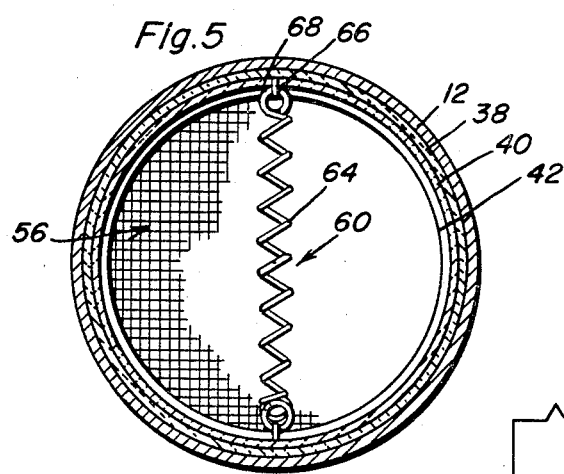
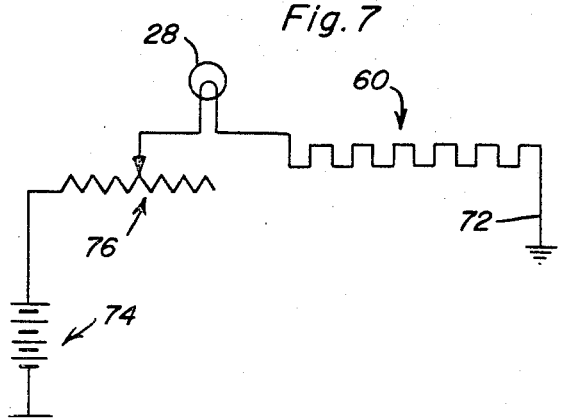
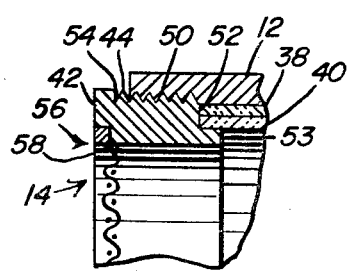
John Prata
INVENTOR.

United States Patent Office 3,407,284
Patented Oct. 22, 1968

3,407,284
ELECTRIC AIR HEATER
John Prata, Detroit, Mich., assignor of twenty-five percent to Vinko Barcic, Highland Park, Mich.
Filed Nov. 4, 1965, Ser. No. 506,363
4 Claims. (Cl. 219—374)

ABSTRACT OF THE DISCLOSURE

An electric air heater includes three concentric tubular members retained in fixed overlying relation by detachable abutting end shields. The inner tubular member is of electrically non-conductive material and the intermediate tubular member is made of thermally insulative material. An electric heating coil is sinusoidally secured between diametrically opposite sides of the inner tubular member. The removable end closures include central screen portions for screening air passing through the heater. A heat controlling rheostat and an indicating lamp are connected in series with the heating element.

---

This invention relates generally to heaters and more specifically to an electric air heater comprising an elongated cylindrical hollow shell enclosing inner insulative and nonconductive cylindrical members, and which further includes mounted for heat generation via the open ends of the shell a continuous heating element adapted to be connected to an external source of electricity.

It is an object of the instant invention to provide an electrically operated heating device including temperature control means and means for indicating the operative condition of the device.

It is another object of the present invention to provide a lightweight, mobile and compact electrical air heater which is simple in design and construction while at the same time being extremely efficient in operation.

It is another object of the present invention to provide a hollow cylindrical electrical heating device including heating elements supported therein and open to air currents sweeping through the device to convey heat from the device by convection.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is an enlarged elevational view of the air heater with parts broken away in order to disclose the inner components of the heater;

FIGURE 5 is a vertical sectional view taken substantially on the plane of the line 5—5 of FIGURE 4;

FIGURE 6 is an enlarged partial vertical sectional view of the end mounting structure of the heating device; and FIGURE 7 is a schematic diagram of the electrical components comprising a portion of the present invention.

Figure 1:
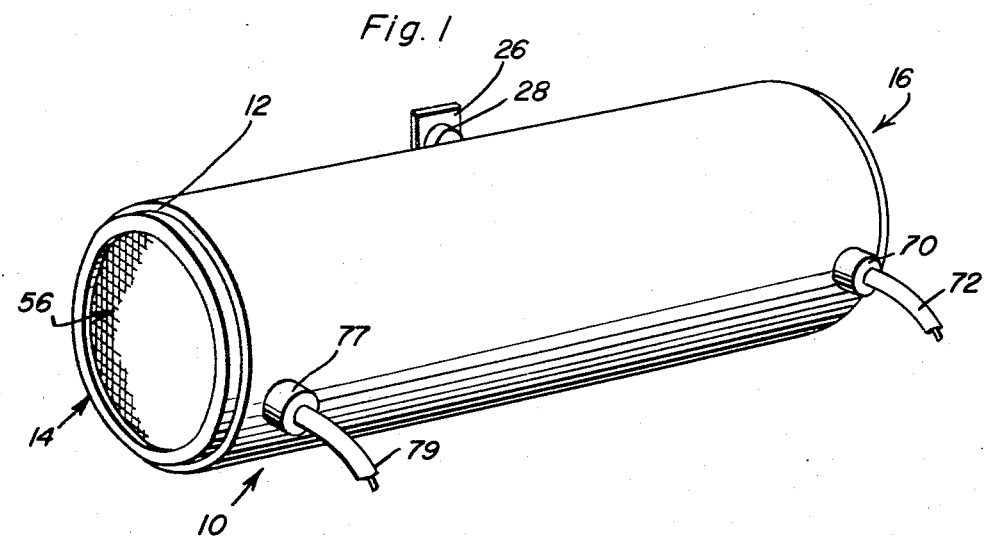
FIGURE 1 is a perspective view of the air heater comprising the present invention.

Referring now more specifically to the drawings, reference numeral 10 generally denotes the air heater comprising the present invention. The air heater 10 includes an outer elongate hollow cylindrical shell 12 of lightweight metallic material such as aluminum or the like, the shell 12 being closed at the ends by closures generally denoted by reference numerals 14 and 16.

Figure 2:
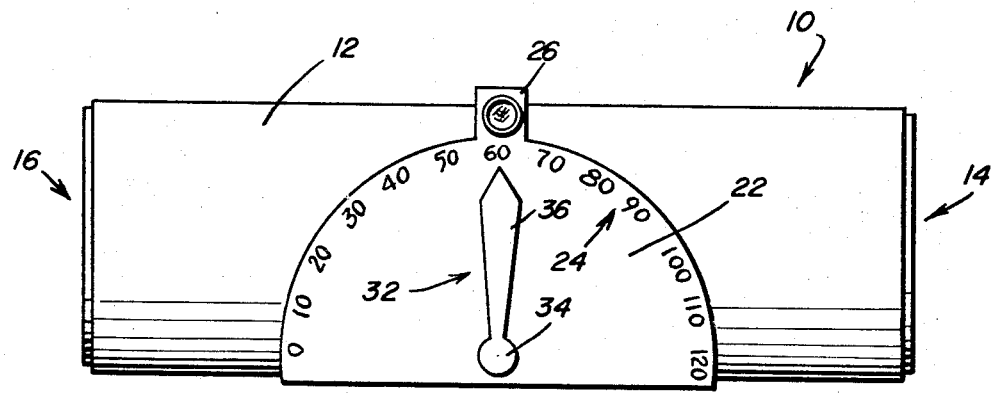
FIGURE 2 is a front elevational view of the air heater illustrated in FIGURE 1.

Mounted on the front of the shell 12 on struts 18 and 20 which extend forwardly and horizontally outwardly from the shell 12 is a semicircular plate 22 which comprises a heat selector dial plate. Graduated indications 24 are equally spaced about the outer edge of the plate 22. An upstanding bracket portion 26 is integrally formed on the plate 22 and has mounted therein a conventional light bulb 28 for a purpose to be described more fully below. Rotatably mounted on the face of the plate 22 and mounted on an arm 30 which extends through the plate 22 and is rotatable therein is the arrow-like indicator 32 which includes a bottom circular portion 34 and upper indicating arm portion 36. As will be best observed in FIGURE 2, the indicating arm portion 36 of indicator 32 may be moved to the left or right of the illustrated center position in order to correspond with the gradations on the plate 22 and thereby provide an indication of the heat being produced by the device 10.

Referring now to FIGURES 4–6, it will be observed that the outer tube or shell 12 encloses an intermediate insulative cylindrical member 38 and an innermost cylindrical member 40 of a suitable nonconductive material. The members 38 and 40 are coaxial with the shell 12 and tightly engaged thereby, and as may be observed in FIGURES 5 and 6, the shell 12 and cylindrical members 38 and 40 comprise three engaging layers.

Referring further to FIGURES 4–6, it will be observed that the end closure members 14 and 16 referred to above comprise annular members 42 which are externally threaded as indicated by reference numeral 44 in order to be received within the end openings 46 and 48 of the shell 12. The shell 12 is internally threaded as indicated by reference numeral 50 adjacent the ends 46 and 48 in order to receive the threaded portions 44 of the annular members 42 therein. As will be observed, the inner cylindrical members 38 and 40 are of less longitudinal length than the shell 12, and thus will be held in fixed position in the shell 12 when the shoulders 52 formed on the reduced end portions 53 of annular members 42 contact the ends thereof. Thus, by viewing FIGURE 6 in particular, it will be appreciated that when the annular members 42 are threaded into the ends 46 and 48 of the shell 12, the shoulders 52 will contact the ends of cylindrical members 38 and 40 and thus fix them longitudinally in the shell 12. Further, it will be seen that the annular members 42 include the shoulders 54 about the outer periphery thereof at the end of the threaded portion 44 in order to limit the inward axial threaded movement of the annular members into the shell 12.

Figure 3:
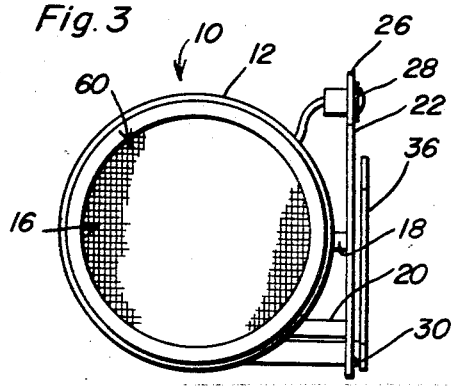
FIGURE 3 is a side elevational view of the air heater illustrated in FIGURE 1.

Referring again to FIGURE 6 in particular, it will be observed that a screen member generally denoted by reference numeral 56 is provided to cover the open end 58 of the annular members 42. Further, as will be noted in FIGURE 3, for example, a screen grid 60 is also provided in the enclosure 16. The screen grids 56 and 60 are identical in construction and provide effective closures for the open ends 58 of the annular members 42 in order to prevent foreign objects such as a person's foot or hand from entering the heater 10, and thus the screens provide protective closure means for the heater 10. Further, it will be appreciated due to the grid-like nature of the screens 56 and 60 air will be allowed to pass therethrough, thus allowing air currents to flow through the heater.

Referring now to FIGURES 4 and 5, it will be observed that a heating element generally denoted by reference numeral 60 is mounted in the chamber 62 within the inner cylindrical member 40. Further, as described above, the cylindrical member 40 is formed of nonconductive material. The heating element 60 is fabricated of a suitable resistance wire 64 cylindrical in form as illustrated in FIGURES 4 and 5, the coiled wire being fastened in the chamber 62 on hangers 66 which are mounted in the cylinder 40 in a continuous sinusoidal path. Thus, it will be observed that a single coil 68 of the sinusoidal coiled wire 64 extends through the hangers 66 which are positioned axially along the cylinder 44 in opposed offset spaced relation therealong. The hangers 66 may be constructed of suitable insulative material such as porcelain or the like. One end of the heating element 60 extends through the cylindrical members 38 and 40 and through the shell 12 and is connected to an output plug or terminal 70 having the lead wire 72 attached thereto for suitable connection to an electrical source such as the battery generally denoted by reference numeral 74. The other end of the heating element 60 is connected over suitable lead lines to the bulb 28, a rheostat 76 and then in series with the bulb 28 and rheostat 76 to a second output plug or terminal 77 having the lead wire 79 attached thereto for suitable connection to the battery 74. Thus, by viewing FIGURE 7, it will be observed that the heating element 60 is in series with the bulb 28, rheostat 76 and battery 74 and thus when the heater 10 is activated, the bulb 28 will light. Further, the bulb 28 will provide an indication of an open circuit, as for example if the wire 64 of the heating element 60 were to break. The rheostat 76 is not illustrated but, as may be appreciated, may be mounted on the shell 12 in operative connection with the rotatable member 30, whereby the rheostat will be adjusted when the indicator 32 is selectively moved in registry on the plate 22. Thus, the amount of heat generated by the element 60 is selectively adjustable through the rheostat 76, and an indication of the degree of heat generated will be provided by the indicator 32.

In view of the above description it will be apparent that the heater 10 provides a variable output heater element mounted therein in the form of a sinusoidally coiled resistance wire, the ends of the heater being open whereby air may move axially through the heater and thus cause heat to be conveyed by convection outwardly of the heater. Further, the outer shell 12 of the heater will ordinarily not become hot when the heater is being used due to the insulation provided by the cylindrical member 38 as well as the fact that the heating element 60 is hung on the hangers 66 and is thus fully insulative from the outer shell 12. Further, as will be apparent from FIGURE 3 the device needs no other support than provided by the bottom of the plate 22 and the bottom of the shell 12 and thus will stand upright without the necessity of added supporting brackets or members.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An electric air heater comprising an elongate hollow body shell, having oppositely disposed open ends, a hollow insulative member mounted in said body shell and having oppositely disposed open ends respectively inwardly of said shell ends, an elongate hollow member of electrical non-conductive properties mounted in said insulative body member and having oppositely disposed open ends respectively coplanar therewith, threaded means interiorly formed within oppositely disposed end portions of said body shell for fixedly retaining said insulative hollow member and said non-conductive hollow member within said body shell at opposite ends thereof, said latter mentioned means characterized by annular members having external threads thereon for engagement with said body shell at both ends thereof, each of said annular members having an interior shoulder for abutting respective coplanar ends of said hollow insulative and elongate hollow members upon securement of said annular members in said body shell, and a heating element mounted within said non-conductive hollow member.

2. The combination of claim 1 wherein said heating element is an elongate continuous element, means for mounting said heating element in sinusoidal position within said non-conductive hollow member, and means for operatively connecting the ends of said heating element to an energizing source whereby said heating element can be selectively energized.

3. The combination of claim 2 including rheostat means in electrical series with said heating element, means on said body shell for indicating the setting of said rheostat means, said indicating means being operatively connected to said rheostat means whereby movement of said indicating means will cause the adjustment of said rheostat means.

4. The combination of claim 3 including means for indicating the operative condition of said heating element.

References Cited

UNITED STATES PATENTS

| | | | |
|---|---|---|---|
| 1,633,801 | 6/1927 | Williams | 219—376 |
| 1,756,033 | 4/1930 | Nordan | 219—375 X |
| 1,991,735 | 2/1935 | Eaton | 219—380 |
| 2,278,180 | 3/1942 | Lewis | 219—380 |
| 2,431,620 | 11/1947 | Ries | 219—370 |
| 2,597,215 | 5/1952 | Wright et al. | 219—374 X |

FOREIGN PATENTS

| | | |
|---|---|---|
| 721,657 | 12/1931 | France. |
| 905,176 | 9/1962 | Great Britain. |

ANTHONY BARTIS, *Primary Examiner.*